(12) United States Patent
McDowell et al.

(10) Patent No.: US 7,957,453 B2
(45) Date of Patent: Jun. 7, 2011

(54) METHOD FOR OPERATING A RAKE RECEIVER

(75) Inventors: Anthony T. McDowell, Fort Wayne, IN (US); Daniel P. Roth, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 624 days.

(21) Appl. No.: 12/052,315

(22) Filed: Mar. 20, 2008

(65) Prior Publication Data

US 2009/0238244 A1 Sep. 24, 2009

(51) Int. Cl.
*H04B 1/00* (2006.01)

(52) U.S. Cl. ....................................................... 375/144

(58) Field of Classification Search .................. 375/144, 375/148, 344
See application file for complete search history.

(56) References Cited

U.S. PATENT DOCUMENTS

| | | | |
|---|---|---|---|
| 5,301,167 A | 4/1994 | Proakis et al. | |
| 5,305,349 A | 4/1994 | Dent | |
| 5,619,524 A | 4/1997 | Ling et al. | |
| 5,648,983 A | 7/1997 | Kostic et al. | |
| 6,215,814 B1 | 4/2001 | Ylitalo et al. | |
| 6,269,075 B1 | 7/2001 | Tran | |
| 6,278,725 B1 * | 8/2001 | Rouphael et al. | 375/148 |
| 6,363,102 B1 | 3/2002 | Ling et al. | |
| 6,442,193 B1 | 8/2002 | Hirsch | |
| 6,529,545 B2 | 3/2003 | Tiirola et al. | |
| 6,556,634 B1 | 4/2003 | Dent | |
| 6,570,910 B1 | 5/2003 | Bottomley et al. | |
| 6,674,740 B1 | 1/2004 | Siala | |
| 6,738,608 B2 | 5/2004 | Black et al. | |
| 6,873,667 B2 | 3/2005 | Papasakellariou et al. | |
| 6,947,403 B2 | 9/2005 | Heikkila et al. | |
| 6,947,470 B2 | 9/2005 | Berens | |
| 6,947,474 B2 | 9/2005 | Kober et al. | |
| 6,996,375 B2 | 2/2006 | Dent et al. | |
| 7,027,815 B2 | 4/2006 | Sendonaris | |
| 7,031,737 B1 | 4/2006 | Braam et al. | |
| 7,039,096 B2 | 5/2006 | Han | |
| 7,058,117 B1 | 6/2006 | Iancu et al. | |
| 7,110,481 B2 | 9/2006 | Yang | |
| 7,142,585 B2 | 11/2006 | Baltersee et al. | |
| 7,167,506 B2 | 1/2007 | Baltersee et al. | |

(Continued)

FOREIGN PATENT DOCUMENTS

WO  WO 03/058839 A1  7/2003

(Continued)

OTHER PUBLICATIONS

Gong et al.; "A Frequency Tracking Rake Demodulator for Multipath Channels;" Proceedings of the military Communications Conference, IEEE, vol. 3 of 3; Sep. 30, 1990; pp. 1020-1024.

(Continued)

*Primary Examiner* — David C. Payne
*Assistant Examiner* — Leon-Viet Q Nguyen
(74) *Attorney, Agent, or Firm* — Daly, Crowley, Mofford & Durkee, LLP

(57) ABSTRACT

A rake receiver and method for operating a rake receiver is provided including receiving a signal in a rake receiver having at least one finger, each of the at least one finger characterized by a channel phase and a channel frequency, removing a phase and a portion of the frequency component of the signal in a first block of the at least one finger, and removing a remaining frequency component of the signal in a second block of the at least one finger.

24 Claims, 5 Drawing Sheets

U.S. PATENT DOCUMENTS

| | | | |
|---|---|---|---|
| 7,200,133 B2 | 4/2007 | Lin | |
| 7,286,583 B2 | 10/2007 | Feng et al. | |
| 7,286,593 B1 | 10/2007 | Banerjee | |
| 2004/0116121 A1 | 6/2004 | Sendonaris | |
| 2008/0049816 A1* | 2/2008 | Nakajima | 375/148 |

FOREIGN PATENT DOCUMENTS

| | | | |
|---|---|---|---|
| WO | WO-03058839 A1 * | 7/2003 | |

OTHER PUBLICATIONS

PCT Search Report and Written Opinion of the ISA dated Jul. 9, 2009 for PCT/US2009/036899.

Notification Concerning Transmittal of International Preliminary Report on Patentability (Chapter 1 of the Patent Cooperation Treaty), PCT/US2009/036899, date of mailing Sep. 30, 2010, 8 pages.

* cited by examiner

METHOD FOR OPERATING A RAKE RECEIVER

FIELD OF THE INVENTION

This invention relates generally to rake receivers for use in wireless communications. In particular, the invention is directed toward rake receivers for removing Doppler-induced frequency shifts of a multipath signal from a high-speed communicator.

BACKGROUND

As is known in the art, in wireless communications, multipath is a propagation phenomenon that results in wireless communications signals reaching a receiver by more than a single path. There are many causes of multipath including atmospheric effects and obstructions from terrestrial objects such as mountains and buildings. The effects of multipath include cross-interference of the multipath signals and phase shifting caused by the varying geographic lengths each electromagnetic signal must travel.

Multipath can be modeled using impulse response methods for linear systems. For example, a wireless communications transceiver will transmit an original signal, b, subject to multipath. More than one version of the original signal, which may be provided as an impulse, will arrive at different times at a wireless communications receiver. The versions of the signal will often be attenuated. The received signal s at the receiver at time t can be represented using the following equation:

$$s(t) = \Sigma_{(n=0,N-1)} b(t-\tau_n) g_n(t-\tau_n) e^{j\theta n(t-\upsilon n)}$$

In this equation, N is the number of received impulses, which can be very large due to the number of paths of the signal. $\tau_n$ represents the time delay experienced by the $n^{th}$ path. $g_n e^{j\theta n}$ is the complex amplitude and phase response of each path.

In digital communications, multipath can cause inter-symbol interference (ISI) errors and affect the quality of communications. Hardware and software techniques can be employed to correct ISI, including equalizers, orthogonal frequency division modulation, and rake receivers.

As is also known, a rake receiver is used to counteract the effects of multipath using multiple sub-receivers built into a receiver. The sub-receivers are often referred to as fingers because they are analogous to the function of the fingers on a garden rake, i.e., each finger collects communications bits similar to how each finger of a garden rake collects different leaves.

In a rake receiver, each finger tunes to a different multipath component of the signal. Each finger decodes the signal and outputs it to a combiner. The combiner uses the different transmission characteristics of the outputs to produce a signal, typically having a higher signal-to-noise ratio than the separate signals.

Rake receivers are common in Code Division Multiple Access (CDMA) and Wide-CDMA (W-CDMA) used by various radio communications technologies and well-known in the art. These wireless communications technologies can experience undesired frequency shifts in radio communications due to the Doppler Effect. The Doppler Effect is an observed shift in the frequency of traveling waves caused by relative movements between a wave transmitter and a wave receiver. In wireless radio, the shifts in frequency depend on whether the wave transmitter, for example, a mobile radio unit, is moving toward or away from the wave receiver, for example, a radio tower. Doppler Effect produces a received frequency corresponding to the transmitted frequency offset by the shift in frequency.

The Doppler Effect can be represented as follows:

$$f_d = fv/c$$

$f_d$ is the shift in frequency, v is the velocity of the transmitter relative to the receiver, and c is the speed of an electromagnetic wave. The observed frequency f' will equal the transmitted frequency f plus (or minus) $f_d$ as follows:

$$f' = f \pm f_d \text{ or } f' = f \pm fv/c$$

Existing rake receivers can adapt to relatively slow changing phase and amplitude variations within a multipath environment. However, existing rake receivers cannot adapt fast enough to counteract significant Doppler shift experienced during wireless radio communications from high-speed transmitters. In such instances, the Doppler Effect can degrade performance of a Direct-Sequence Spread Spectrum (DSSS) waveform commonly used in CDMA communications technologies. DSSS is a modulation technique well known in the art.

DSSS phase-modulates an information signal pseudo-randomly with a continuous string of pseudo-noise (PN) code symbols known as chips. The chips have a shorter duration than the information bits. In this way, DSSS modulates the information bits by a sequence of much faster chips, producing a chip rate that is much higher than the information bit rate. A receiver can receive the transmitted signal and use the same string of PN code symbols to reconstruct the information signal.

It would, therefore, be desirable to provide a rake receiver and a method of operating a rake receiver to counteract the Doppler Effect in wireless radio communications regardless of the amount of any Doppler shift caused by movement of receivers and transmitters. It would also be desirable to provide a rake receiver and method of operation which allows the rake receiver to adapt to relatively large Doppler shifts in a multipath environment.

SUMMARY

In accordance with the present invention, a method for operating a rake receiver includes receiving a signal in a rake receiver having one or more fingers with each of the one or more fingers characterized by a channel phase and a channel frequency, removing a phase and a portion of the frequency component of the signal in a first block of each finger, and removing a remaining frequency component of the signal in a second block of each finger.

With this particular arrangement, a method is provided for operating a rake receiver by increasing the rake receiver from a first-order rake receiver to a second-order rake receiver. However, the rake receiver is not limited to second-order and can be higher than second-order, such as third-order, fourth-order, etc. The rake receiver processes the signal in a first block or portion of each finger of the rake receiver. The first block or portion removes slowly varying components of the signal, including phase and frequency components. The rake receiver further processes the signal in a second block or portion of each finger, coupled to the first block. The second block or portion removes remaining variations in frequency. Each finger of the rake receiver can be configured to account for different Doppler on the communications paths.

The signals may be those transmitted by a transmitter or received by a receiver in a mobile communications environment. For example, the rake receiver can be disposed on wireless tower and receive and operate on signals provided from a high-speed communicator, such as a jet fighter. Typically, the wireless tower is coupled to a base station for processing signals from a number of cellular towers in a wireless network. The base station may forward the signals to other networked components for processing.

The rake receiver is adapted to counteract significant Doppler on Direct-Sequence Spread Spectrum (DSSS) communications originating from high-speed communicators. Moreover, the rake receiver of the present invention accounts for Doppler shift while maintaining multipath performance.

In another aspect, a method for operating a rake receiver includes receiving a signal in a rake receiver having fingers, each finger characterized by a channel phase and a channel frequency. The method includes delaying the signal in a first block of the fingers to obtain a first block delayed signal and multiplying the first block delayed signal by a previous decision of the signal to obtain a first block multiplied signal having a data bit removed. The method further includes obtaining the complex conjugate of the first block multiplied signal to obtain a first block complex conjugate signal. The method includes multiplying the first block complex conjugate signal by the signal to obtain a first block result signal.

The method further includes receiving the first block result signal in a second block of the fingers. The method includes delaying the first block result signal to obtain a second block delayed signal. The method includes multiplying the second block delayed signal by the previous decision of the signal to obtain a second block multiplied signal having the data bit removed. The method includes obtaining the complex conjugate of the second block multiplied signal to obtain a second block complex conjugate signal. The method includes multiplying the second block complex conjugate signal by the first block result signal to obtain a result signal.

In accordance with a further aspect of the present invention, a rake receiver includes one or more fingers with each of the one or more fingers characterized by a channel phase and a channel frequency. Each finger includes a channel estimator to receive a signal. Each finger further includes a first portion to remove a phase and a portion of the frequency component of the signal, and a second portion to remove a remaining frequency component of the signal. With this particular arrangement, a rake receiver capable of detecting and processing signals having significant Doppler shift and which exist in a multipath environment is provided.

In another aspect of the invention, the first portion includes a first input to receive a signal. The first portion includes a first delayer coupled to the first input to delay the signal. The first portion includes a first multiplier coupled to the first delayer to multiply the delayed signal with a previous decision for the signal and to remove a data bit from the signal. The first portion includes a first complex conjugator coupled to the first multiplier to obtain the multiplied signal and to generate the complex conjugate of the signal. The first portion includes a second multiplier coupled to the first complex conjugator to multiply the complex conjugated signal with the signal to obtain a first output signal. The first portion includes a first output coupled to the second multiplier in the second portion.

The second portion includes a second input coupled to the first output of the first portion to obtain the first output signal. The second portion includes a second delayer coupled to the second input to delay the signal. The second portion includes a third multiplier coupled to the second delayer to multiply the delayed signal with the previous decision for the signal and to remove a data bit to obtain a multiplied signal. The second portion includes a second complex conjugator coupled to the third multiplier to generate the complex conjugate of the signal. The second portion includes a fourth multiplier coupled to the second complex conjugator to multiply the complex conjugated signal with the first output signal to obtain a result signal. The second portion includes a second output to output the result signal.

BRIEF DESCRIPTION OF THE DRAWINGS

The foregoing features of this invention, as well as the invention itself, may be more fully understood from the following description of the drawings in which.

DETAILED DESCRIPTION

Figure 1:
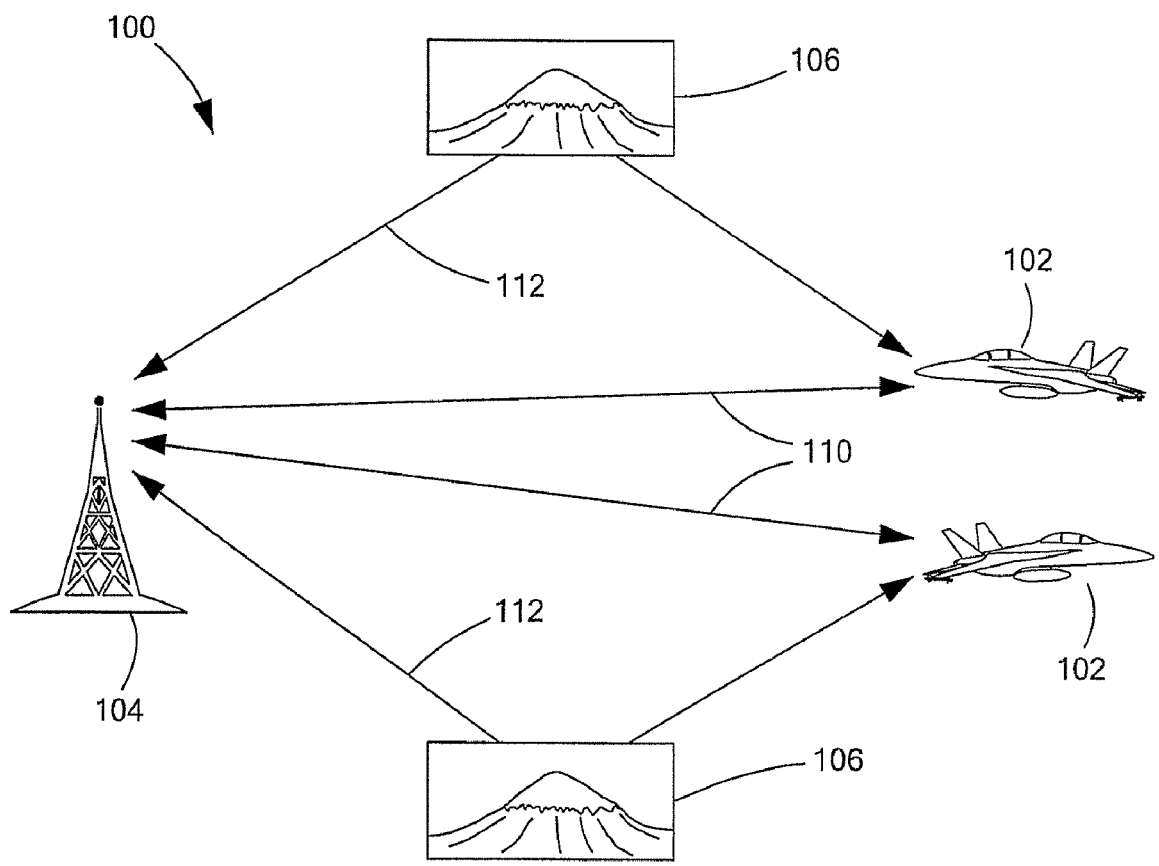
FIG. 1 is a diagrammatical view of a multipath signal environment in which a rake receiver may operate.

Referring to FIG. 1, an environment in which a rake receiver operates is shown. Wireless communications may be transmitted from a moving platform (e.g. a jet fighter 102) and received at a wireless receiver 104 which is shown as being disposed in a tower. The signals may be received on a direct path 110 or an indirect path 112 such as when the signals reflect off a mountain 106, building, or other terrestrial obstacles. The indirect path signal 112 will arrive later than the direct path signal 110 and may be attenuated in comparison to the direct path signal 110. By providing the receiver as a rake receiver, the multipath components of the communications signal can be detected and processed.

The rake receiver is adapted to remove a channel phase and a channel frequency from the multipath signal and may be included in a receiver apparatus of the communications tower, a high-speed communicator in the field, for example, a jet fighter or a projectile, or other apparatus or vehicles for transmitting and/or receiving wireless communications. In one wireless communications environment, for example, the rake receiver could be installed in a jet fighter for receiving and tracking signals from a high-speed projectile launched from the jet fighter or a military installation.

Figure 2:
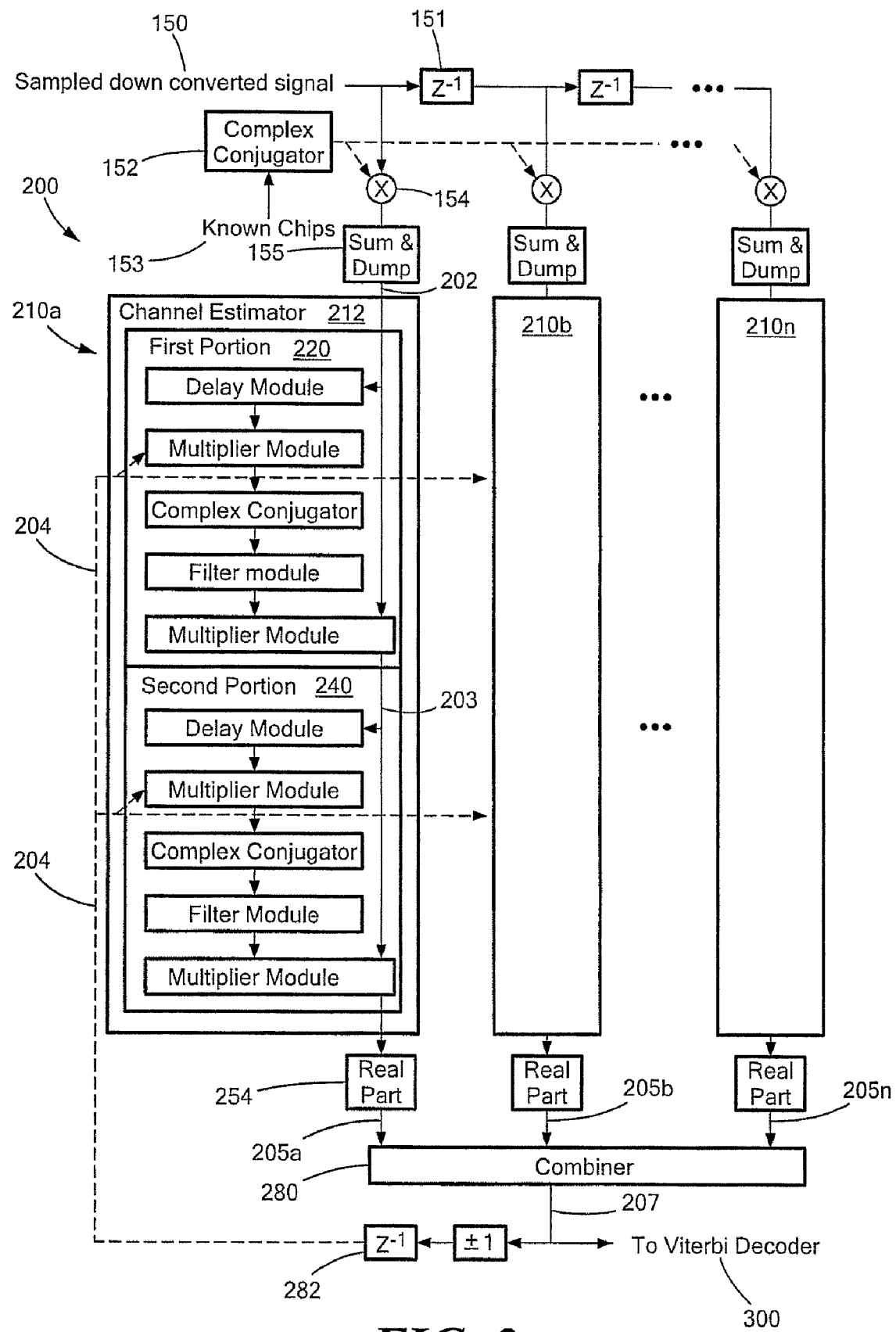
FIG. 2 is a block diagram of a rake receiver.

Referring now to FIG. 2, a rake receiver receives the sampled down-converted signal 150 of a multipath communications signal and delay modules 151 introduce delays into the received signal. A complex conjugator 152 obtains the complex conjugate of known chips 153, which multipliers 154 multiply with the delayed signal. Sum and dump elements 155 sum and dump the multiplied result at each finger 210a, 210b, 210n for further processing as explained below.

The rake receiver 200 uses one or more sub-receivers or fingers 210a, 210b, . . . 210n. Each of the fingers processes a received signal 202 at a slight delay and removes a phase and frequency component from the received signal. In this way, each finger is tuned to an individual multipath phase and frequency component of the communications signal. Those of ordinary skill in the art will appreciate how to select the appropriate number of fingers to use in a particular application. The rake receiver can further include other elements, for example, a combiner, Viterbi decoder, etc., to combine and process the outputs of the fingers to produce more reliable and accurate results.

The rake receiver is adapted to counteract Doppler in communications environments which experience significant Doppler frequency shifts, for example, of at least 900 Hz. The rake receiver is also adapted to counteract less significant Doppler experienced at lower velocities, for example, Doppler frequency shifts below 900 Hz in communications signals from communicators traveling at less than Mach 1.

Taking finger 210a as exemplary of the fingers 210b-210n, the finger 210a of the rake receiver 200 is characterized by a channel frequency and a channel phase and comprises a channel estimator 212 for processing the signals at various phase/frequency combinations. Channel estimator 212 has at least a first portion 220 and a second portion 240. The first and second portions 220, 240 result in the second-order nature of the rake receiver. In particular, the first portion 220 removes a phase and portion of the frequency component of the signal 202 and the second portion 240 removes a remaining frequency component of the signal 202.

Conventional rake receivers are first order because they use only a single delay block in channel estimation part of each finger.

The rake receiver of the present invention, on the other hand, has two blocks in the channel estimation part of each finger. The second block raises the order of the channel estimation to second order and allows estimation of both phase and frequency. The first block or second block may be used to estimate the stepped phase, but both the first and second block are required to remove the ramped phase caused by the Doppler frequency.

Each finger receives a signal, s, characterized by Equation 1:

$$s = b_i g e^{j(\theta + f_d^* \Delta t^* i)}.$$ 
Equation 1 in which:
$b_i$ represents the $i^{th}$ bit value;
g represents the channel gain;
$e^{j(\theta + f_d^* \Delta t^* i)}$ represents the channel phase, wherein $\theta$ is the steady channel phase and $f_d$ is the channel Doppler frequency shift; and
$\Delta t$ is the change in time between the previous and present bit value. $\Delta t^* i$ is the change between the first and present bit values.

Thus, in Equation 1, the signal s equals the $i^{th}$ bit value ($b_i$) multiplied by the channel gain g and channel phase $e^{j(\theta + f_d^* \Delta t^* i)}$.

In the first block, the signal s is delayed and multiplied by the previous decision at i−1 to remove the bit value because $1^2 = (-1)^2 = 1$. The complex conjugate is obtained and multiplied with signal s in equation 1 as shown in Equation 2:

$$b_i g e^{j(\theta + f_d^* \Delta t^* i)} g e^{-j(\theta + f_d^* \Delta t^*(i-1))} = b_i g^2 e^{j(f_d^* \Delta t)}$$ 
Equation 2

In Equation 2, the phase component of the signal is removed, as well as a portion of the frequency component. Equation 2 represents the output of the first block 220. The phase $\theta$ has been corrected, but a portion of the Doppler still remains, although it is reduced to a phase.

The second block 240 removes the remaining Doppler component. In Equation 3, the output of the second block is multiplied by the output of the first block.

$$b_i g^2 e^{j(f_d^* \Delta t)} g^2 e^{-j(f_d^* \Delta t)} = b_i g^4$$ 
Equation 3

The result of Equation 3 includes only the channel gain $g^4$ and the data $b_i$. The gain can be used in the combiner 280. For example, the combiner can select the finger output with the largest gain, sum the outputs of all the fingers, or use the maximal ratio. In the alternative, channel gain g or $g^2$ can be obtained by adding gain normalization to either one of the blocks or to both the first and second blocks.

In one embodiment, the combiner 280 generates a combined signal 207 by combining the output signal 205a, 205b, 205n from at least one finger 210a, 210b, 210n and provides the combined signal 207 to a Viterbi decoder 300. Preferably, a real-part extractor 254 obtains the real part of the outputted signal 205 before the signal 205 passes to the combiner 280.

Figure 3:
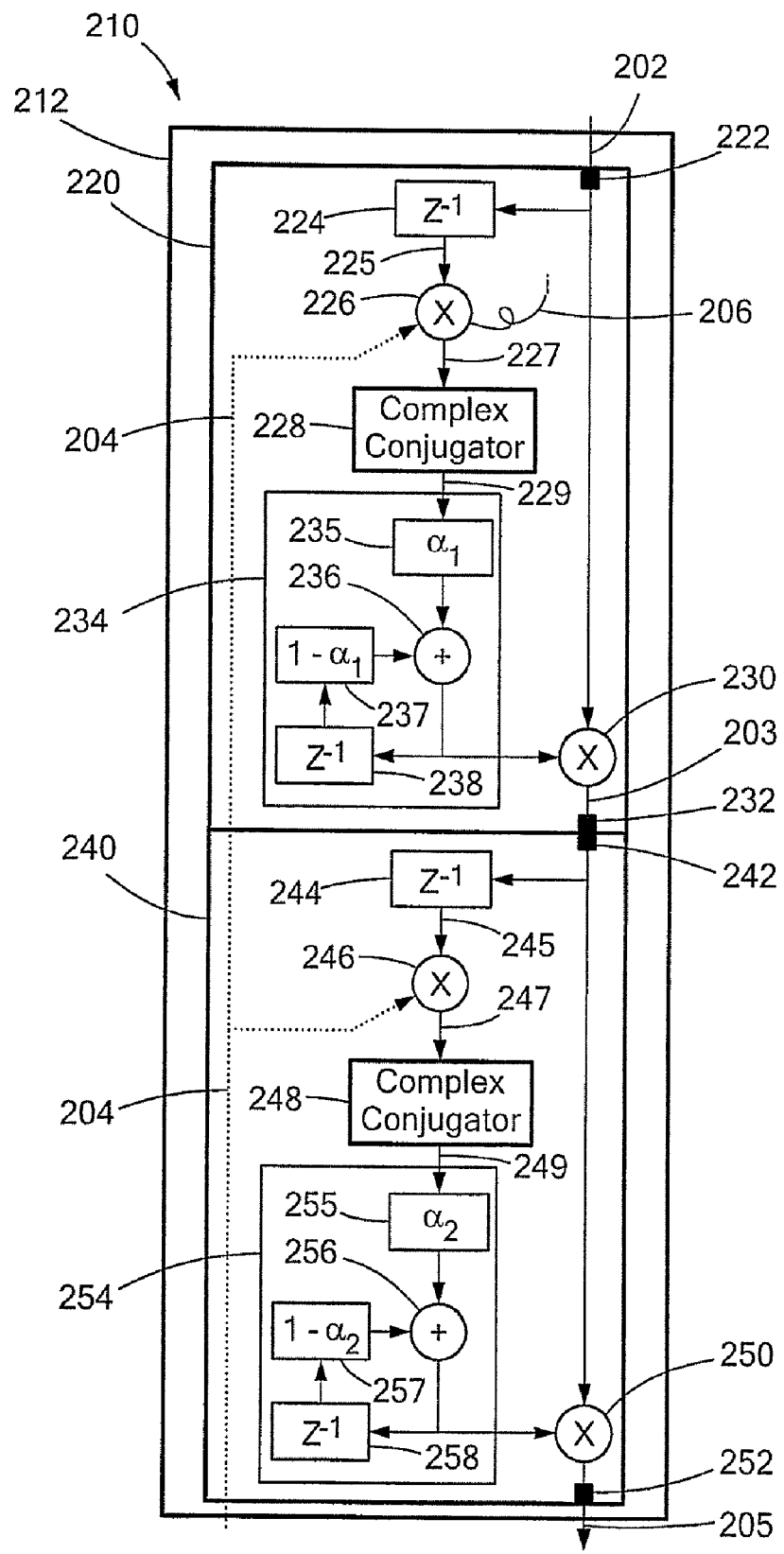
FIG. 3 is a block diagram of a first and second block of a finger of the rake receiver shown in FIG. 2.

The Viterbi decoder 300 uses the Viterbi algorithm for decoding a bit stream by determining the most likely output stream based on the observed signal. The combined signal 207 may serve as a previous decision of the signal 204 to provide as input to the fingers as shown in FIGS. 2 and 3. The previous decision 204 is obtained by delaying and hard-limiting the combined signal 207. This delay is identical to the delays within the first and second portions 220, 240 of the channel estimator 212. Preferably, the combiner 280 outputs soft decisions that are appropriate for the Viterbi decoder 300. The channel estimator 212 uses hard decisions, so the soft decisions are hard-limited to obtain hard decisions. The delay module 282 then synchronizes the previous decision 204 with the signal in the channel estimator 212 so that the data may be removed.

In one embodiment, the first and second portions 220, 240 may be coupled to each other. For example, the second portion 240 may receive the output 203 of the first portion 220 multiplied with the received signal 202.

The channel estimator is not limited to only a second-order arrangement with two portions, and could be an n-order estimator with n portions, wherein n is a number greater than two, for example three, four, five, or 10 portions, etc. Thus, the rake receiver could exhibit n-order channel estimation characteristics, the order depending on the needs of the system and environmental conditions.

Furthermore, the invention is not limited to a channel estimator in which the first and second portions 220, 240 are coupled in series as shown in FIG. 2. For example, other elements may intervene between the first and second portions, or the first and second portions may process the signal in parallel in parallel electric circuits or using software routines executing in parallel, and the results may be combined for further processing. The further processing may include further processing in replicated first and second portions 220, 240.

Referring to FIG. 3, in which like elements of FIG. 2 are provided having like reference designations, the first portion 220 of each finger 210 includes a first input 222 to receive the signal 202. Signal 202 is coupled from input 222 to an input of a delay circuit 224, which introduces a first delay $Z^{-1}$ to the signal 202. The appropriately delayed signal 225 is coupled from an output of the delay circuit 224 to an input of first multiplier 226 which multiplies the delayed signal 225 with a previous decision for the signal 204 to remove a data bit 206 from the signal. Multiplier 226 provides an output signal 227 to an input of a first complex conjugator 228. First complex conjugator 228 generates the complex conjugate of the signal 229 and provides the signal 229 to a low pass filter circuit 234 which appropriately filters the signal 229 provided thereto and provides the filtered signal to a second multiplier circuit 230. Multiplier 230 multiplies the filtered complex conjugated signal 229 with the received signal 202 and provides an output signal 203 to a first output 232 which is coupled to the second finger portion 240 at an input to a delay circuit 244 and also at an input of a third multiplier circuit 250.

The second portion 240 of each finger 210 includes a second input 242 to receive the signal 202, a second delayer 244 coupled to the second input 242 to delay the signal, a third multiplier 246 coupled to the second delayer 244 to multiply the delayed signal 245 with the previous decision for the signal 204, a second complex conjugator 248 coupled to the third multiplier 246 to generate the complex conjugate of the signal 249. Signal 249 is provided to the second low pass filter circuit 254. The low pass filtered signal is coupled to a fourth multiplier 250 to multiply the filtered complex conjugated signal 249 with the signal 202, and a second output 252 to output a second portion output signal 205.

The output signal 205 includes the phase and frequency corrected contribution to the combiner for finger 210. If there is no multipath component present for finger 210, the output signal 205 will tend toward zero. If there is a multipath component present, the output signal 205 will be related to the signal strength of this component.

Those of ordinary skill in the art will appreciate that the rake receiver may be implemented as a software program tangibly embodied on a memory device. The software program can be a set of software programming instructions written in a software language well-known in the art, for example, C++, Java, etc. The software instructions can be organized into separate modules for executing a portion of the rake receiver functionality. For example, the delay circuit 224 can be implemented as in a delay module, and the complex conjugator 228 can be implemented as a complex conjugator module. The delay module can output the delayed signal 225 to the complex conjugator module.

As is well known in the art, the software functionality of the rake receiver can be designed and developed in an integrated software development environment (IDE), for example, Microsoft Visual C++. Alternatively, a command line environment could be used, such as DOS.

The software instructions can be compiled into binary executables for storage in a computer memory. The binary executables can be loaded and executed in a Central Processing Unit (CPU) for executing the functionality of the rake receiver. The CPU can be supplied on chip. Dual CPUs can be supplied on a dual-core chip.

Alternatively, the rake receiver may be implemented using circuit hardware components (e.g., discrete and/or integrated circuits). The hardware components can be comprised of hardware components well known in the art, for example, RF components typically found on an RF printed circuit board (PCB) and mounted using surface mount technology (SMT).

In still a further embodiment, the rake receiver may be implemented using a combination of software, firmware and hardware. For example, the multiplier 226 can be implemented using a circuit hardware and the complex conjugator can be implemented in software. In one embodiment, the rake receiver may be implemented in a field-programmable gate array (FPGA) or a digital signal processor (DSP).

In one embodiment, the rake receiver is configured to receive Direct-Sequence Spread Spectrum (DSSS) signals in a Code-Division Multiple Access (CDMA) multipath environment. In a further embodiment, the rake receiver is configured to receive signals in a Wideband Code-Division Multiple Access (W-CDMA) multipath environment.

In another embodiment, the low-pass filter 234 is disposed to filter noise from the first portion signal and to reduce effects of a wrong previous decision 204. As discussed above, the low-pass filter 234 can be coupled to the first portion 220 at, for example, the complex conjugator 228. The low-pass filter 234 receives the complex conjugated signal 229 and uses a filter constant $\alpha_1$. The larger the filter constant, the faster the channel estimator can track changes in the channel phase and channel frequency. This is offset by less noise filtering and a greater impact from wrong previous decisions 204.

The low-pass filter 234 processes the signal 229 using an adder 236 with inputs for $\alpha_1$ 235 and $1-\alpha_1$ 237. Input 237 can be delayed using a delayer 238. The low-pass filter 234 passes a modified version of signal 229 to multiplier 230. The low-pass filter 234 may be coupled to the first portion 220 at other locations, for example, at the output of the multiplier 230. Furthermore, more than one low-pass filter may be employed depending on the needs of the application.

The rake receiver may also include a low-pass filter 254 to filter noise from the second portion signal. The low-pass filter 254 can be coupled to the second portion 240 at, for example, the complex conjugator 248. The low-pass filter 254 receives the complex conjugated signal 249 and uses a filter constant $\alpha_2$ to process the signal 249 using an adder 256 with inputs for $\alpha_2$ 255 and $1-\alpha_2$ 257. Input 257 can be delayed using a delayer 258. The low-pass filter 254 passes a modified version of signal 249 to multiplier 250.

In a further embodiment, low-pass filters 234 and 254 are used in the first and second portions, respectively. The filter constants $\alpha_1$ and $\alpha_2$ can be selected to produce various desired results depending on the communications environment. For example, a values less than or equal to 0.125 may be used.

In a further embodiment, the signal is a received signal which originates from a communicator traveling at a speed less than or equal to Mach 1.

In a further embodiment, the signal is a received signal at a mobile unit traveling at a speed of less than or equal to Mach 1, the received signal originating from a stationary source.

In another embodiment, the signal is affected by the Doppler Effect producing a frequency shift of at least 900 Hertz.

Figure 4:
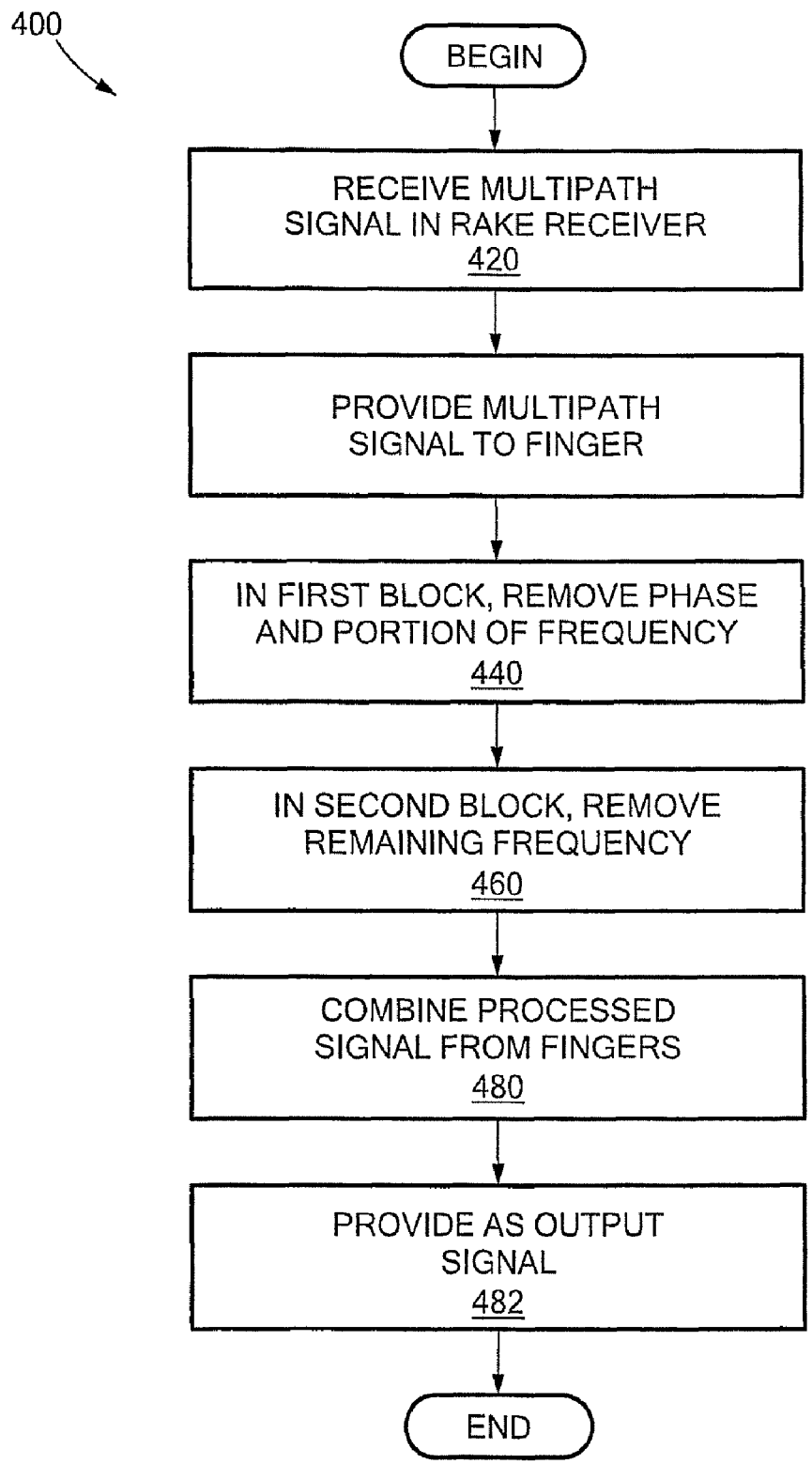
FIG. 4 is a flow diagram of a method for operating a rake receiver.

Referring to FIG. 4, a method of operating a rake receiver 400 includes receiving 420 a signal in a rake receiver having fingers characterized by a channel phase and a channel frequency. The method includes removing 440 a phase and a portion of the frequency component of the signal in a first block of each finger. The method includes removing 460 a remaining phase component of the signal in a second block of each finger.

Figure 5:
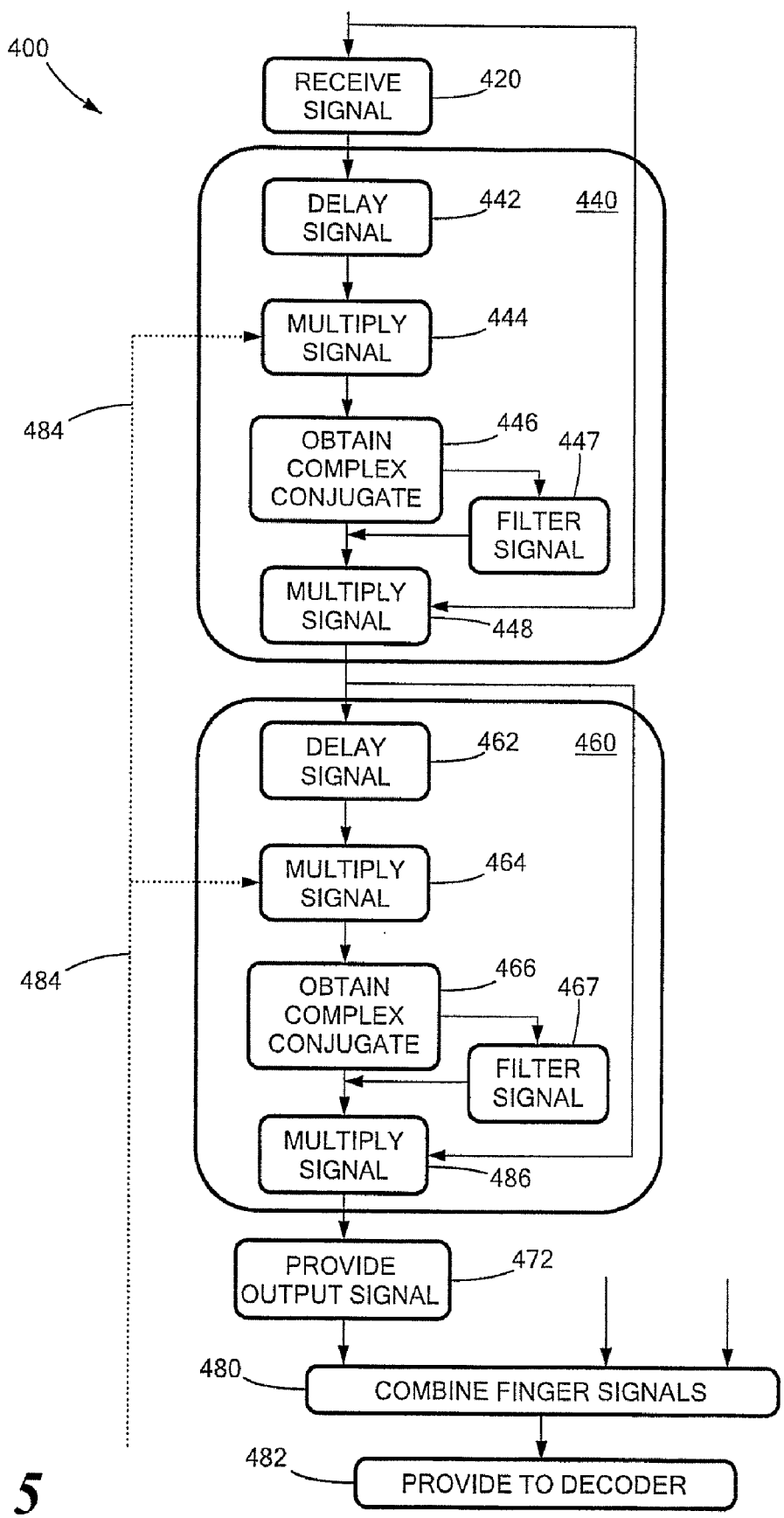
FIG. 5 is a detailed flow diagram of the method shown in FIG. 4.

Referring to FIG. 5, in at least one embodiment of the invention, the method 400 includes receiving 420 a signal in a rake receiver having fingers characterized by a channel phase and a channel frequency. The method includes delaying 442 the signal in a first block of the finger to obtain a first block delayed signal. The method includes multiplying 444 the first block delayed signal by a previous decision of the signal to obtain a first block multiplied signal having a data bit removed. The method includes obtaining 446 the complex conjugate of the first block multiplied signal to obtain a first block complex conjugate signal. Preferably, the method includes low pass filtering 447 the first block complex conjugate signal. The method includes multiplying 448 the first block filtered complex conjugate signal by the signal to obtain a first block result signal.

In at least one embodiment, the method includes receiving 462 the signal in a second block of the finger. The method includes delaying 462 the signal to obtain a second block delayed signal. The method includes multiplying 464 the second block delayed signal by the previous decision of the signal to obtain a second block multiplied signal having the data bit removed. The method includes obtaining 466 the complex conjugate of the second block multiplied signal to obtain a second block complex conjugate signal. Preferably, the method includes low pass filtering 467 the second block complex conjugate signal. The method includes multiplying 468 the second block filtered complex conjugate signal by the first block result signal to obtain a result signal.

In a further embodiment, the method 400 further includes the steps of providing 472 a finger output signal for each finger, combining 480 the outputted finger signals into a combined output signal, and providing 482 the combined output signal to a decoder which may, for example, be provided as a Viterbi decoder. The combined output signal is also provided 484, suitably delayed and hard-limited, as the previous decision signal.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A method for operating a rake receiver comprising:
   receiving a signal in a rake receiver having at least one finger, each of the at least one finger characterized by a channel phase and a channel frequency;
   delaying the signal in a first block of the at least one finger to obtain a first block delayed signal;
   multiplying the first block delayed signal by a previous decision of the signal to obtain a first block multiplied signal having a data bit removed;
   obtaining the complex conjugate of the first block multiplied signal to obtain a first block complex conjugate signal;
   multiplying the first block complex conjugate signal by the signal to obtain a first block result signal;
   receiving the first block result signal in a second block of the at least one finger;
   delaying the first block result signal to obtain a second block delayed signal;
   multiplying the second block delayed signal by the previous decision of the signal to obtain a second block multiplied signal having the data bit removed;
   obtaining the complex conjugate of the second block multiplied signal to obtain a second block complex conjugate signal; and
   multiplying the second block complex conjugate signal by the first block result signal to obtain a result signal.

2. The method of claim 1, wherein the rake receiver is configured to receive Direct-Sequence Spread Spectrum (DSSS) signals in a Code-Division Multiple Access (CDMA) multipath environment.

3. The method of claim 1, wherein the rake receiver is configured to receive signals in a Wideband Code-Division Multiple Access (W-CDMA) multipath environment.

4. The method of claim 1, further comprising:
   providing a finger output signal at each of the at least one finger;
   combining each of the outputted finger signals into a combined output signal; and
   providing the combined output signal to a Viterbi decoder.

5. The method of claim 1, further comprising:
   filtering the signal in the first block using a low-pass filter.

6. The method of claim 1, further comprising:
   filtering the signal in the second block using a low-pass filter.

7. The method of claim 1, wherein the signal is a received signal originating from a communicator traveling at a speed less than or equal to Mach 1.

8. The method of claim 1, wherein the signal is a received signal at a mobile unit traveling at a speed of less than or equal to Mach 1.

9. The method of claim 1, wherein the signal is affected by the Doppler Effect producing a frequency shift of at least 900 Hertz.

10. The method of claim 1, wherein the method is implemented in software tangibly embodied on a memory device.

11. The method of claim 1, wherein the method is implemented in hardware.

12. The method of claim 1, wherein at least one of the steps of the method is implemented in software tangibly embodied on a memory device and at least one of the steps of the method is implemented in hardware.

13. A rake receiver comprising:
    at least one finger characterized by a channel phase and a channel frequency and comprising:
    a channel estimator to receive a signal and having a first portion to remove a phase component and a portion of the frequency component of the signal and a second portion to remove a remaining frequency component of the signal, wherein
    the first portion comprises:
      a first input to receive a signal;
      a first delayer coupled to the first input to delay the signal;
      a first multiplier coupled to the first delayer to multiply the delayed signal with a previous decision for the signal and to remove a data bit from the signal;
      a first complex conjugator coupled to the first multiplier to generate the complex conjugate of the signal;
      a second multiplier coupled to the first complex conjugator to multiply the complex conjugated signal with the signal;
      a first output coupled to the second multiplier to output a first portion output signal;
    and the second portion comprises:
      a second input coupled to the first output of the first portion to receive the first portion output signal;
      a second delayer coupled to the second input to delay the signal;
      a third multiplier coupled to the second delayer to multiply the delayed signal with the previous decision for the signal;
      a second complex conjugator coupled to the third multiplier to generate the complex conjugate of the signal;
      a fourth multiplier coupled to the second complex conjugator to multiply the complex conjugated signal with the signal; and
      a second output to output a result signal.

14. The rake receiver of claim 13, wherein the rake receiver is configured to receive Direct-Sequence Spread Spectrum (DSSS) signals in a Code-Division Multiple Access (CDMA) multipath environment.

15. The rake receiver of claim 13, wherein the rake receiver is configured to receive signals in a Wideband Code-Division Multiple Access (W-CDMA) multipath environment.

16. The rake receiver of claim 13, further comprising:
    a combiner to generate a combined signal by combining the output signal from the at least one finger and to provide the combined signal to a Viterbi decoder.

17. The rake receiver of claim 13, further comprising:
    a low-pass filter to filter the first portion signal.

18. The rake receiver of claim 13, further comprising:
    a low-pass filter to filter the second portion signal.

19. The rake receiver of claim 13, wherein the signal is a received signal originating from a communicator traveling at a speed less than or equal to Mach 1.

20. The rake receiver of claim 13, wherein the signal is a received signal at a mobile unit traveling at a speed of less than or equal to Mach 1.

21. The rake receiver of claim 13, wherein the signal is affected by the Doppler Effect producing a frequency shift of at least 900 Hertz.

22. The rake receiver of claim 13, wherein the rake receiver is a software program tangibly embodied on a memory device.

23. The rake receiver of claim 13, wherein the rake receiver is a hardware system.

24. The rake receiver of claim 13, wherein the rake receiver is at least one of a hardware system or a software program tangibly embodied on a memory device.

* * * * *